US012073981B2

(12) United States Patent
Annen et al.

(10) Patent No.: US 12,073,981 B2
(45) Date of Patent: Aug. 27, 2024

(54) COIL COMPONENT

(71) Applicant: Murata Manufacturing Co., Ltd., Kyoto-fu (JP)

(72) Inventors: Kazunori Annen, Nagaokakyo (JP); Katsufumi Sasaki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 688 days.

(21) Appl. No.: 17/137,235

(22) Filed: Dec. 29, 2020

(65) Prior Publication Data

US 2021/0210274 A1 Jul. 8, 2021

(30) Foreign Application Priority Data

Jan. 7, 2020 (JP) ................................ 2020-000973

(51) Int. Cl.

*H01F 27/28* (2006.01)
*H01F 27/24* (2006.01)
*H01F 27/29* (2006.01)
*H01F 41/04* (2006.01)

(52) U.S. Cl.

CPC ......... *H01F 27/2804* (2013.01); *H01F 27/24* (2013.01); *H01F 27/29* (2013.01); *H01F 41/041* (2013.01); *H01F 2027/2809* (2013.01)

(58) Field of Classification Search

CPC ...... H01F 27/2804; H01F 27/24; H01F 27/29; H01F 41/041; H01F 2027/2809; H01F 27/292; H01F 27/306; H01F 27/323; H01F 41/046

See application file for complete search history.

(56) References Cited

U.S. PATENT DOCUMENTS

| | | | | |
|---|---|---|---|---|
| 2010/0157565 A1* | 6/2010 | Yoshida | H01G 4/33 | 361/811 |
| 2013/0271251 A1* | 10/2013 | Tseng | H01F 41/042 | 336/200 |
| 2014/0139307 A1* | 5/2014 | Kido | H01F 27/292 | 29/609 |
| 2016/0042862 A1* | 2/2016 | Tachibana | H01F 17/0013 | 336/200 |
| 2020/0211758 A1* | 7/2020 | Sato | H01F 27/29 | |
| 2021/0090786 A1* | 3/2021 | Arai | H01F 27/255 | |
| 2021/0183564 A1* | 6/2021 | Kang | H01F 27/32 | |
| 2021/0183565 A1* | 6/2021 | Matsuura | H01F 27/292 | |

(Continued)

FOREIGN PATENT DOCUMENTS

| | | |
|---|---|---|
| CN | 101763933 A | 6/2010 |
| CN | 103703524 A | 4/2014 |

(Continued)

*Primary Examiner* — Shawki S Ismail
*Assistant Examiner* — Matthew T Sarles
(74) *Attorney, Agent, or Firm* — Studebaker & Brackett PC

(57) ABSTRACT

A first substrate has recesses respectively provided at corner portions of a bottom surface. Outer electrodes each have an electrode body portion provided around an associated one of the recesses on the bottom surface. The electrode body portions each are made up of a plurality of laminated metal layers. A first metal layer located at an innermost side of the plurality of metal layers is formed on the bottom surface at a position spaced apart from a short-side ridge portion between the bottom surface and a side surface.

16 Claims, 10 Drawing Sheets

(56) References Cited

U.S. PATENT DOCUMENTS

| | | | | |
|---|---|---|---|---|
| 2022/0044858 | A1* | 2/2022 | Matsuura | H01F 27/2804 |
| 2022/0181068 | A1* | 6/2022 | Kim | H01F 27/29 |
| 2022/0279651 | A1* | 9/2022 | Maniwa | H05K 1/0306 |
| 2023/0160047 | A1* | 5/2023 | Kwon | C22C 45/02<br>148/304 |

FOREIGN PATENT DOCUMENTS

| | | | | |
|---|---|---|---|---|
| CN | 110265214 | A * | 9/2019 | H01F 27/2804 |
| JP | 6254071 | B2 | 12/2017 | |
| JP | 2018-64204 | A | 4/2018 | |
| WO | 13/031880 | A1 | 3/2013 | |

* cited by examiner

COIL COMPONENT

CROSS-REFERENCE TO RELATED APPLICATION

This application claims benefit of priority to Japanese Patent Application No. 2020-000973, filed Jan. 7, 2020, the entire contents of which is incorporated herein by reference.

BACKGROUND

Technical Field

The present disclosure relates to a coil component.

Background Art

Hitherto, electronic components are mounted on various electronic devices. For example, a laminated coil component is known as one of the electronic components, as described, for example, in International Publication No. 2013-031880). In the coil component of International Publication No. 2013-031880, outer electrodes are provided at four corners on the bottom surface of a substrate. Each of the outer electrodes is made up of a plurality of metal layers. Also, in the coil component of International Publication No. 2013-031880, ridge portions of the substrate and the like are chamfered by barrel polishing.

Incidentally, in the thus configured coil component, when chamfering is performed by barrel polishing or the like, surface layer parts of the outer electrodes in chamfering may be elongated on the bottom surface of the substrate. In this way, when there is an elongation in the outer electrodes, stress easily concentrates on that portion, so, when high temperature treatment is performed by means of mounting reflow or the like, a fracture of the substrate or cracks of the electrodes may occur. In this way, there remains room for improvement in terms of reliability.

SUMMARY

Accordingly, the present disclosure provides a coil component capable of contributing to improvement in reliability.

According to preferred embodiments of the present disclosure, a coil component includes a magnetic substrate having a rectangular bottom surface having a pair of long sides and a pair of short sides, a top surface located across from the bottom surface, and a pair of long-side side surfaces and a pair of short-side side surfaces each connecting the bottom surface and the top surface, a multilayer body having an electrically insulating layer formed on the top surface and a coil formed in the electrically insulating layer, and an outer electrode provided on the bottom surface. The magnetic substrate has a recess provided at a corner portion of the bottom surface. The outer electrode has an electrode body portion provided around the recess on the bottom surface. The electrode body portion is made up of a plurality of laminated metal layers and has a base layer located at an innermost side of the plurality of metal layers in a lamination direction of the multilayer body. The base layer is formed on the bottom surface at a position spaced apart from a short-side ridge portion between the bottom surface and one of the short-side side surfaces. Here, the "innermost side" means a position closest to the magnetic substrate among the plurality of laminated metal layers.

With this configuration, since the base layer is formed on the bottom surface at a position spaced apart from the short-side ridge portion between the bottom surface and one of the side surfaces, an elongation of the base layer along the short-side ridge portion by barrel polishing and the like is suppressed. An elongation of the base layer along the short-side ridge portion is suppressed, so it is possible to suppress stress concentration on the portion. Therefore, it is possible to suppress occurrence of a fracture of the substrate and a crack of the outer electrode around the portion.

Other features, elements, characteristics and advantages of the present disclosure will become more apparent from the following detailed description of preferred embodiments of the present disclosure with reference to the attached drawings.

DETAILED DESCRIPTION

Hereinafter, an embodiment will be described with reference to the accompanying drawings.

The accompanying drawings may illustrate components in a magnified view for the sake of easy understanding. The scale ratio of components may be different from actual ones or those in other drawings.

Figure 1:
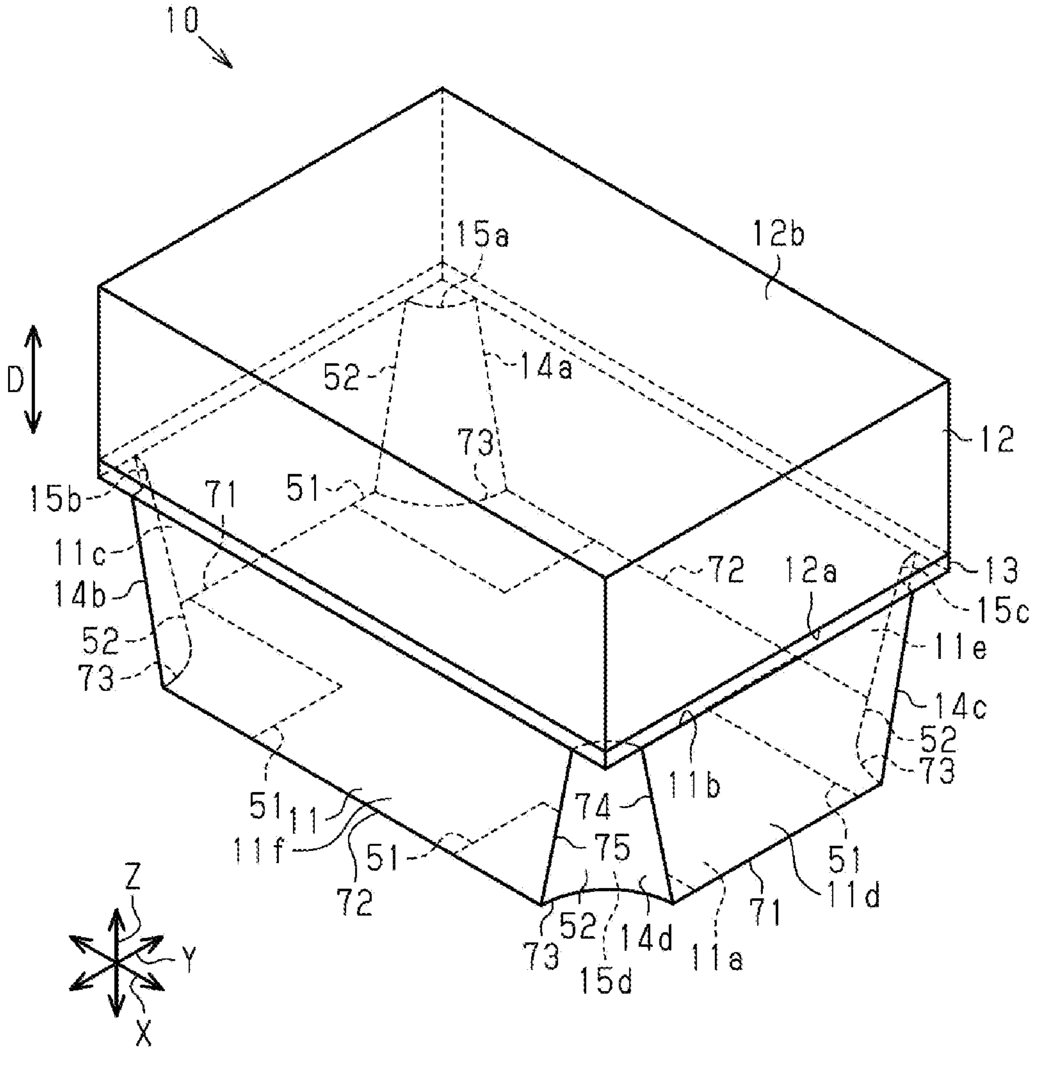
FIG. 1 is a perspective view of a coil component according to an embodiment.

As shown in FIG. 1, a coil component 10 has a substantially rectangular parallelepiped shape. The coil component 10 includes a first substrate 11, a second substrate 12, a multilayer body 13, and outer electrodes 14*a*, 14*b*, 14*c*, 14*d*. The first substrate 11 and the second substrate 12 are laminated so as to sandwich the multilayer body 13.

In FIG. 1, a lamination direction D of the first substrate 11, the multilayer body 13, and the second substrate 12 in the coil component 10 is defined as Z-axis direction, and a direction in which the long sides of the coil component 10 extend is defined as X-axis direction and a direction in which the short sides of the coil component 10 extend is defined as Y-axis direction when viewed in the Z-axis direction. In the Z-axis direction, a side where the outer electrodes 14*a* to 14*d* of the coil component 10 are present is defined as lower side, and a side across from the lower side is defined as upper side.

Figure 2:
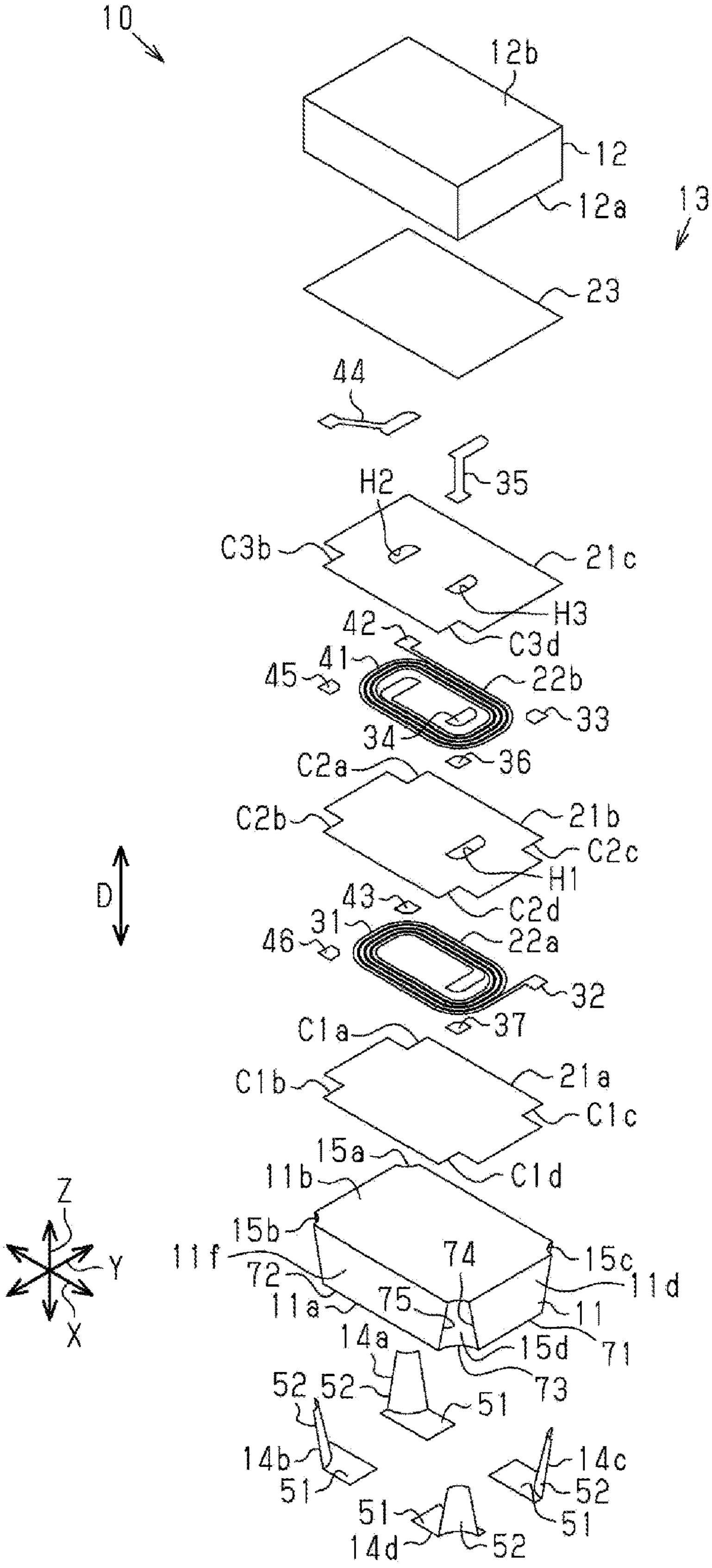
FIG. 2 is an exploded perspective view of the coil component according to the embodiment.

As shown in FIG. 1 and FIG. 2, the first substrate 11 has a substantially sheet shape. The first substrate 11 has a substantially rectangular bottom surface 11*a* and a top surface 11*b* located across from the bottom surface 11*a*. The top surface 11*b* faces the multilayer body 13 in the Z-axis direction, and the bottom surface 11*a* faces away from the multilayer body 13 in the Z-axis direction.

As shown in FIG. 1, the first substrate 11 has two side surfaces 11*c*, 11*d* connecting the bottom surface 11*a* and the top surface 11*b* and facing in the X-axis direction, and two side surfaces 11*e*, 11*f* connecting the bottom surface 11*a* and the top surface 11*b* and facing in the Y-axis direction. The two side surfaces 11*c*, 11*d* facing in the X-axis direction face away from each other. The two side surfaces 11*e*, 11*f* facing in the Y-axis direction face away from each other. The first substrate 11 has short-side ridge portions 71 and long-side ridge portions 72. One of the short-side ridge portions 71 is between the bottom surface 11*a* and the side surface 11*c*, and the other one of the short-side ridge portions 71 is between the bottom surface 11*a* and the side surface 11*d*. One of the long-side ridge portions 72 is between the bottom surface 11*a* and the side surface 11*e*, and the other one of the long-side ridge portions 72 is between the bottom surface 11*a* and the side surface 11*f*.

Here, in this specification, the "substantially rectangular shape" includes such a shape that at least one of the four corner portions of the substantially rectangular shape is cut out. In other words, in the bottom surface 11*a* serving as a bottom surface, such a shape of the bottom surface 11*a* that four corner portions each formed by extending the short-side ridge portion 71 and the long-side ridge portion 72 are cut out in a substantially circular arc shape toward the center of the bottom surface 11*a* is also included in the substantially rectangular shape. The shape of the first substrate 11 may be regarded as a substantially rectangular parallelepiped shape having the substantially rectangular bottom surface 11*a*.

The first substrate 11 has recesses 15*a*, 15*b*, 15*c*, 15*d* recessed toward the center of the first substrate 11 at the four corner portions when viewed in a direction perpendicular to the bottom surface 11*a*. In other words, each of the recesses 15*a*, 15*b*, 15*c*, 15*d* provides a substantially circular arc connection ridge portion 73 at the bottom surface 11*a* and is formed such that the diameter of the circular arc gradually reduces toward the top surface 11*b*.

The first substrate 11 is a magnetic substrate. An example of the magnetic substrate is a ferrite sintered body. The first substrate 11 may be a resin molded body containing magnetic powder. The magnetic powder is, for example, ferrite or a metal magnetic material, such as iron (Fe), silicon (Si), and chromium (Cr), and the resin material is, for example, a resin material, such as epoxy. When the first substrate 11 is a resin containing magnetic powder, it is desirable that magnetic powder is adequately dispersed in a resin when two or more types of magnetic powder having different particle size distributions are mixed.

As shown in FIG. 2, the multilayer body 13 includes a plurality of electrically insulating layers 21*a* to 21*c*, coils 22*a*, 22*b*, and an adhesion layer 23, laminated on the top surface 11*b* of the first substrate 11. In the multilayer body 13, the direction in which the electrically insulating layers 21*a* to 21*c*, the coils 22*a*, 22*b*, and the adhesion layer 23 are laminated coincides with the lamination direction D and the Z-axis direction. The multilayer body 13 may be configured such that, for example, there is no interlayer interface or no other interface between the electrically insulating layers 21*a* to 21*c*.

As shown in FIG. 2, the electrically insulating layers 21*a* to 21*c* are laminated so as to be arranged in order of the electrically insulating layer 21*a*, the electrically insulating layer 21*b*, and the electrically insulating layer 21*c* from the first substrate 11 side in the Z-axis direction. The electrically insulating layers 21*a* to 21*c* have substantially the same size as the top surface 11*b* of the first substrate 11. The electrically insulating layer 21*a* has cutout portions C1*a* to C1*d* at four corners. The electrically insulating layer 21*b* has cutout portions C2*a* to C2*d* at four corners. The electrically insulating layer 21*b* has a via hole H1 extending through in the Z-axis direction. Among the four corners of the electrically insulating layer 21*c*, cutout portions C3*b*, C3*d* are provided at both end portions at one side in the Y-axis direction. The electrically insulating layer 21*c* has via holes H2, H3 extending through in the Z-axis direction.

The cutout portion C1*a* and the cutout portion C2*a* are provided at positions that overlap the outer electrode 14*a* in the Z-axis direction. The cutout portion C1*b*, the cutout portion C2*b*, and the cutout portion C3*b* are provided at positions that overlap the outer electrode 14*b* in the Z-axis direction. The cutout portion C1*c* and the cutout portion C2*c* are provided at positions that overlap the outer electrode 14*c* in the Z-axis direction. The cutout portion C1*d*, the cutout portion C2*d*, and the cutout portion C3*d* are provided at positions that overlap the outer electrode 14*d* in the Z-axis direction.

The electrically insulating layers 21*a* to 21*c* may be made by using various resin materials, such as polyimide resin, epoxy resin, phenolic resin, and benzocyclobutene resin.

The coil 22*a* includes a coil conductor 31 and extended portions 32, 33, 34, 35, 36, 37.

The coil conductor 31 is provided between the electrically insulating layer 21*a* and the electrically insulating layer 21*b* and has a substantially flat spiral shape that approaches the center while winding in a clockwise direction when viewed in plan from the upper side in the Z-axis direction. The center of the coil conductor 31 coincides with the center of the coil component 10 when viewed in plan in the Z-axis direction.

The extended portion 32 is connected to an outer end portion of the coil conductor 31. The extended portion 32 is extended to the cutout portion C1*c* of the electrically insulating layer 21*a*. The extended portion 32 extends through the electrically insulating layer 21*a* in the Z-axis direction via the cutout portion C1*c*. The extended portion 32 is extended to the cutout portion C2*c* of the electrically insulating layer 21*b* and is connected to the extended portion 33 provided at the cutout portion C2*c*.

The thus configured extended portion 32 is connected to the end portion of the coil conductor 31 and is extended to the cutout portion C1*c* of the electrically insulating layer 21*a* that makes up the multilayer body 13. Thus, the extended portion 32 is exposed to the recess 15*c* when viewed in plan from the lower side toward the upper side in the Z-axis direction.

The extended portion 34 extends through the electrically insulating layer 21*b* in the Z-axis direction via the via hole H1, thus being connected to an inner end portion of the coil conductor 31.

The extended portion 35 is connected to the extended portion 34 such that a first end side extends through the electrically insulating layer 21*c* in the Z-axis direction via the via hole H3. A second end side of the extended portion 35 is extended to the cutout portion C3*d* of the electrically insulating layer 21*c*. The extended portion 35 extends through the electrically insulating layer 21*c* in the Z-axis direction via the cutout portion C3*d*.

The extended portion 36 is provided at the cutout portion C2*d* of the electrically insulating layer 21*b*. Thus, the extended portion 36 is connected to the second end side of the extended portion 35. The extended portion 36 extends through the electrically insulating layer 21*b* in the Z-axis direction via the cutout portion C2*d*.

The extended portion 37 is provided at the cutout portion C1*d* of the electrically insulating layer 21*a*. Thus, the extended portion 37 is connected to the extended portion 36. The extended portion 37 extends through the electrically insulating layer 21*a* in the Z-axis direction via the cutout portion C1*d*.

The thus configured extended portions 34 to 37 are connected to the end portion of the coil conductor 31 and are extended to the cutout portion C1*d* of the electrically insulating layer 21*a* that makes up the multilayer body 13. Thus, the extended portion 37 is exposed to the recess 15*d* when viewed in plan from the lower side toward the upper side in the Z-axis direction.

The coil 22*b* includes a coil conductor 41 and extended portions 42, 43, 44, 45, 46.

The coil conductor 41 is provided between the electrically insulating layer 21*b* and the electrically insulating layer 21*c* and has a substantially flat spiral shape that approaches the center while winding in a clockwise direction when viewed in plan from the upper side in the Z-axis direction. In other words, the coil conductor 41 winds in the same direction as the coil conductor 31. The center of the coil conductor 41 coincides with the center of the coil component 10 when viewed in plan in the Z-axis direction. Thus, the coil conductor 41 overlaps the coil conductor 31 when viewed in plan in the Z-axis direction.

The extended portion 42 is connected to an outer end portion of the coil conductor 41. The extended portion 42 is extended to the cutout portion C2*a* of the electrically insulating layer 21*b*. The extended portion 42 extends through the electrically insulating layer 21*b* in the Z-axis direction via the cutout portion C2*a*.

The extended portion 43 is provided at the cutout portion C1*a* of the electrically insulating layer 21*a*. Thus, the extended portion 43 is connected to the extended portion 42. The extended portion 43 extends through the electrically insulating layer 21*a* in the Z-axis direction via the cutout portion C1*a*.

The thus configured extended portions 42, 43 are connected to the end portion of the coil conductor 41 and are extended to the cutout portion C1*a*. Thus, the extended portion 43 is exposed to the recess 15*a* when viewed in plan from the lower side toward the upper side in the Z-axis direction.

A first end side of the extended portion 44 extends through the electrically insulating layer 21*c* in the Z-axis direction via the via hole H2, thus being connected to an inner end portion of the coil conductor 41. A second end side of the extended portion 44 is extended to the cutout portion C3*b* of the electrically insulating layer 21*c*. The extended portion 44 extends through the electrically insulating layer 21*c* in the Z-axis direction via the cutout portion C3*b*.

The extended portion 45 is provided at the cutout portion C2*b* of the electrically insulating layer 21*b*. Thus, the extended portion 45 is connected to the extended portion 44. The extended portion 45 extends through the electrically insulating layer 21*b* in the Z-axis direction via the cutout portion C2*b*.

The extended portion 46 is provided at the cutout portion C1*b* of the electrically insulating layer 21*a*. Thus, the extended portion 46 is connected to the extended portion 45. The extended portion 46 extends through the electrically insulating layer 21*a* in the Z-axis direction via the cutout portion C1*b*.

The thus configured extended portions 44 to 46 are connected to the end portion of the coil conductor 41 by the extended portion 44 and are extended to the cutout portion C1*b* by the extended portion 46 connected to the extended portion 44 via the extended portion 45. Thus, the extended portion 46 is exposed to the recess 15*b* when viewed in plan from the lower side toward the upper side in the Z-axis direction.

The second substrate 12 has a substantially sheet shape. The second substrate 12 has a bottom surface 12*a* and a top surface 12*b* facing away from the bottom surface 12*a*. The bottom surface 12*a* faces the multilayer body 13 in the Z-axis direction, and the top surface 12*b* faces away from the multilayer body 13 in the Z-axis direction. The second substrate 12 is, for example, a magnetic substrate as an example of a magnetic layer. The second substrate 12 is made of, for example, any one of the materials exemplified for the first substrate 11. The second substrate 12 is bonded to the top surface of the multilayer body 13 with the adhesion layer 23 interposed therebetween. For example, thermosetting polyimide resin may be used as the adhesion layer 23. The second substrate 12 may be made up of a magnetic layer other than the magnetic substrate.

Each of the outer electrodes 14*a*, 14*b*, 14*c*, 14*d* has an electrode body portion 51 and a connection portion 52 connecting the electrode body portion 51 and the coil 22*a* or the coil 22*b*.

The electrode body portion 51 of each of the outer electrodes 14*a*, 14*b*, 14*c*, 14*d* is formed around an associated one of the recesses 15*a* to 15*d* on the bottom surface 11*a* (bottom surface) of the first substrate 11. More specifically, the electrode body portion 51 of the outer electrode 14*a* is formed around the recess 15*a*. The electrode body portion 51 of the outer electrode 14*b* is formed around the recess 15*b*. The electrode body portion 51 of the outer electrode 14*c* is formed around the recess 15*c*. The electrode body portion 51 of the outer electrode 14*d* is formed around the recess 15*d*.

The connection portion 52 of each of the outer electrodes 14*a*, 14*b*, 14*c*, 14*d* is formed at an associated one of the recesses 15*a* to 15*d* of the first substrate 11. More specifically, the connection portion 52 of the outer electrode 14*a* is formed at the recess 15*a*. The connection portion 52 of the outer electrode 14*b* is formed at the recess 15*b*. The connection portion 52 of the outer electrode 14*c* is formed at the recess 15*c*. The connection portion 52 of the outer electrode 14*d* is formed at the recess 15*d*.

The outer electrodes 14*a*, 14*b*, 14*c*, 14*d* are respectively formed at the four corners of the bottom surface 11*a* that is the bottom surface of the first substrate 11. The outer electrodes 14*a*, 14*b*, 14*c*, 14*d* are connected by solder or the like to a land pattern of a mounting substrate for mounting the coil component 10.

Each of the outer electrodes 14*a*, 14*b*, 14*c*, 14*d* is made so as to have a substantially rectangular shape when viewed from the lower side toward the upper side in the Z-axis direction. A short-side direction of each of the outer electrodes 14*a*, 14*b*, 14*c*, 14*d* coincides with a short-side direction of the bottom surface 11*a* of the first substrate 11. A long-side direction of each of the outer electrodes 14*a*, 14*b*, 14*c*, 14*d* coincides with a long-side direction of the bottom surface 11*a* of the first substrate 11. Here, the case in which the sides of the outer electrodes 14*a*, 14*b*, 14*c*, 14*d* are straight and the case in which the sides are slightly wavy are included. The long-side direction of each of the outer electrodes 14*a*, 14*b*, 14*c*, 14*d* does not need to coincide with the long-side direction of the bottom surface 11*a*. The short-side direction of each of the outer electrodes 14*a*, 14*b*, 14*c*, 14*d* does not need to coincide with the short-side direction of the bottom surface 11*a*.

Each of the outer electrodes 14*a*, 14*b*, 14*c*, 14*d* is made up of a plurality of laminated metal layers.

Figure 3:
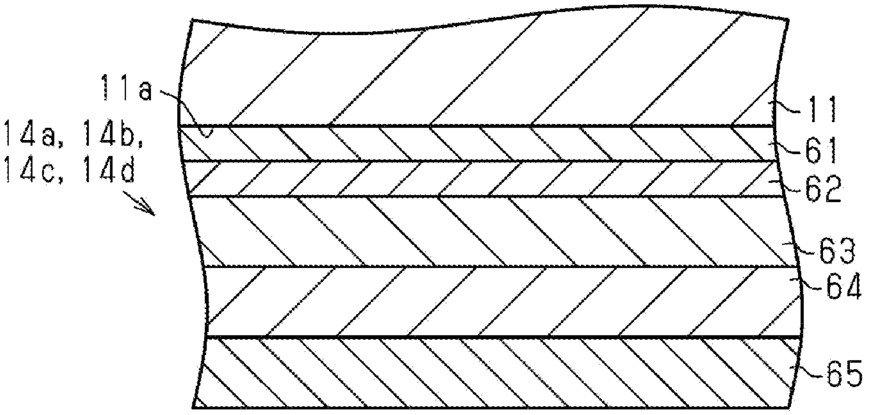
FIG. 3 is a cross-sectional view for illustrating the structure of each outer electrode of the coil component according to the embodiment.

As shown in FIG. 3, the plurality of metal layers includes a first metal layer 61, a second metal layer 62, a third metal layer 63, a fourth metal layer 64, and a fifth metal layer 65. Here, the connection portions 52 of the outer electrodes 14*a*, 14*b*, 14*c*, 14*d* have the same multilayer structure as the electrode body portions 51 of the outer electrodes 14*a*, 14*b*, 14*c*, 14*d*. In other words, when the electrode body portion 51 includes the first metal layer 61, the second metal layer 62, the third metal layer 63, the fourth metal layer 64, and the fifth metal layer 65, the connection portion 52 also similarly includes the first metal layer 61, the second metal layer 62, the third metal layer 63, the fourth metal layer 64, and the fifth metal layer 65.

The first metal layer 61 is provided on the bottom surface 11*a* of the first substrate 11. The first metal layer 61 is located at an innermost side of the metal layers 61 to 65 in the Z-axis direction. In other words, the first metal layer 61 corresponds to a base layer. The first metal layer 61 is a metal thin film containing titanium (Ti) as a main ingredient. The first metal layer 61 is formed by, for example, sputtering. The first metal layer 61 has, for example, a thickness of greater than or equal to about 100 nm and less than or equal to about 200 nm (i.e., from about 100 nm to about 200 nm).

Figure 4:
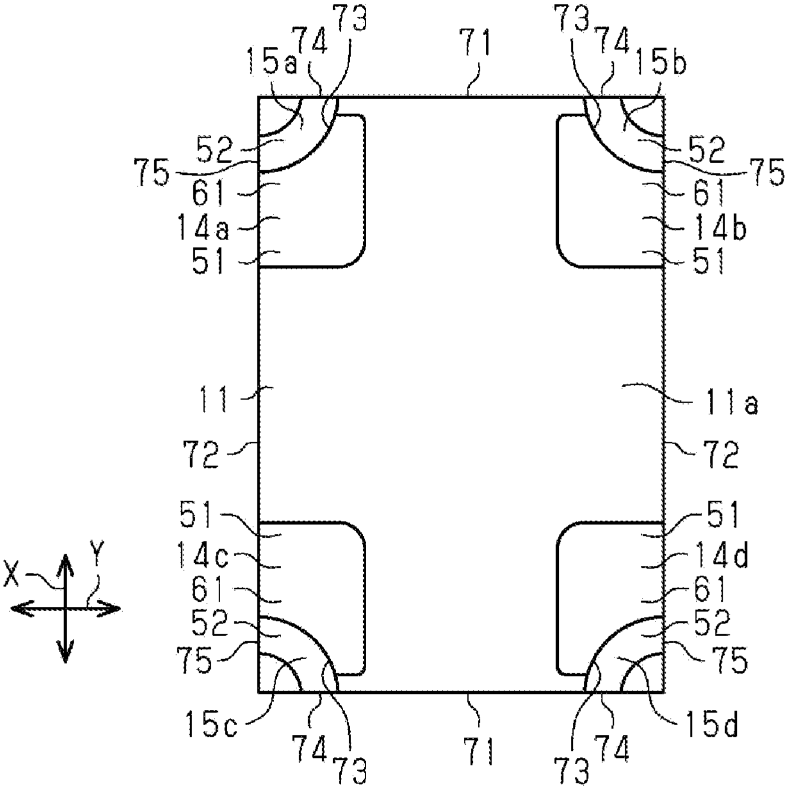
FIG. 4 is a plan view for illustrating first metal layers of the outer electrodes of the coil component according to the embodiment.

As shown in FIG. 4, the first metal layer 61 of the electrode body portion 51 is formed at a position spaced apart from the short-side ridge portion 71 of the first substrate 11. At this time, the first metal layer 61 of the electrode body portion 51 is formed at a position that borders the long-side ridge portion 72 of the first substrate 11.

The second metal layer 62 is provided on the first metal layer 61. The second metal layer 62 is made of a material having a lower electrical resistance than that of the first metal layer 61. More specifically, the second metal layer 62 is a metal thin film containing copper (Cu) as a main ingredient. The second metal layer 62 is formed by, for example, sputtering. The second metal layer 62 has, for example, a thickness of greater than or equal to about 100 nm and less than or equal to about 200 nm (i.e., from about 100 nm to about 200 nm).

Figure 5:
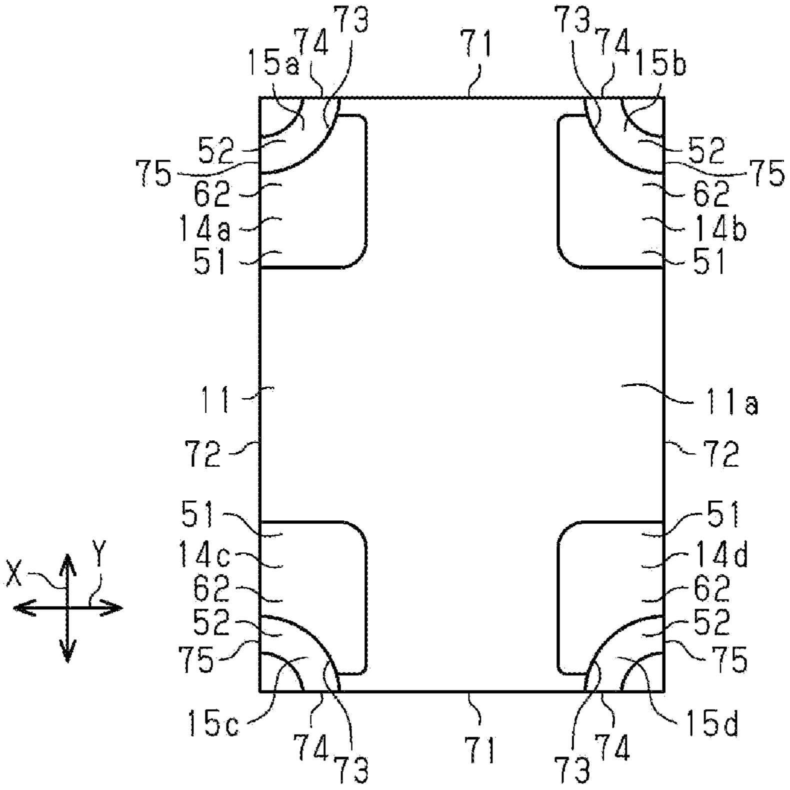
FIG. 5 is a plan view for illustrating second metal layers of the outer electrodes of the coil component according to the embodiment.

As shown in FIG. 5, the second metal layer 62 of the electrode body portion 51 is formed at a position spaced apart from the short-side ridge portion 71 of the first substrate 11. At this time, the second metal layer 62 of the electrode body portion 51 is formed at a position that borders the long-side ridge portion 72 of the first substrate 11. The second metal layer 62 of the electrode body portion 51 corresponds to a low resistance layer.

The third metal layer 63 is provided on the second metal layer 62. The third metal layer 63 is made of a material having a lower electrical resistance than that of the first metal layer 61. More specifically, the third metal layer 63 is a metal film containing copper (Cu) as a main ingredient. The third metal layer 63 is formed by, for example, electrolytic plating. The third metal layer 63 has, for example, a thickness of about 10 μm.

Figure 6:
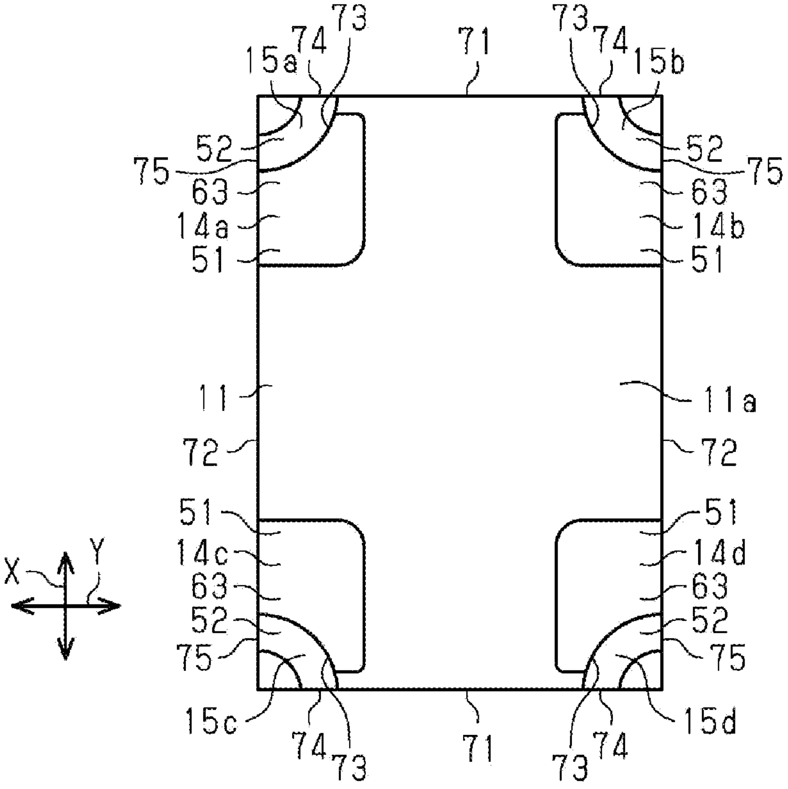
FIG. 6 is a plan view for illustrating third metal layers of the outer electrodes of the coil component according to the embodiment.

As shown in FIG. 6, the third metal layer 63 of the electrode body portion 51 is formed at a position spaced apart from the short-side ridge portion 71 of the first substrate 11. At this time, the third metal layer 63 of the electrode body portion 51 is formed at a position that borders the long-side ridge portion 72 of the first substrate 11. The third metal layer 63 of the electrode body portion 51 corresponds to a low resistance layer.

As shown in FIG. 6, the third metal layer 63 of the connection portion 52 is formed so as to entirely cover the connection portion 52. At this time, the third metal layer 63 is formed up to a position that overlaps a recess ridge portion 74 of an associated one of the recesses 15*a* to 15*d* continuous in a direction from the short-side ridge portion 71 toward the top surface 11*b*. At this time, the third metal layer 63 is formed up to a position that overlaps a ridge portion 75 of an associated one of the recesses 15*a* to 15*d* continuous in a direction from the long-side ridge portion 72 toward the top surface 11*b*.

Figure 7:
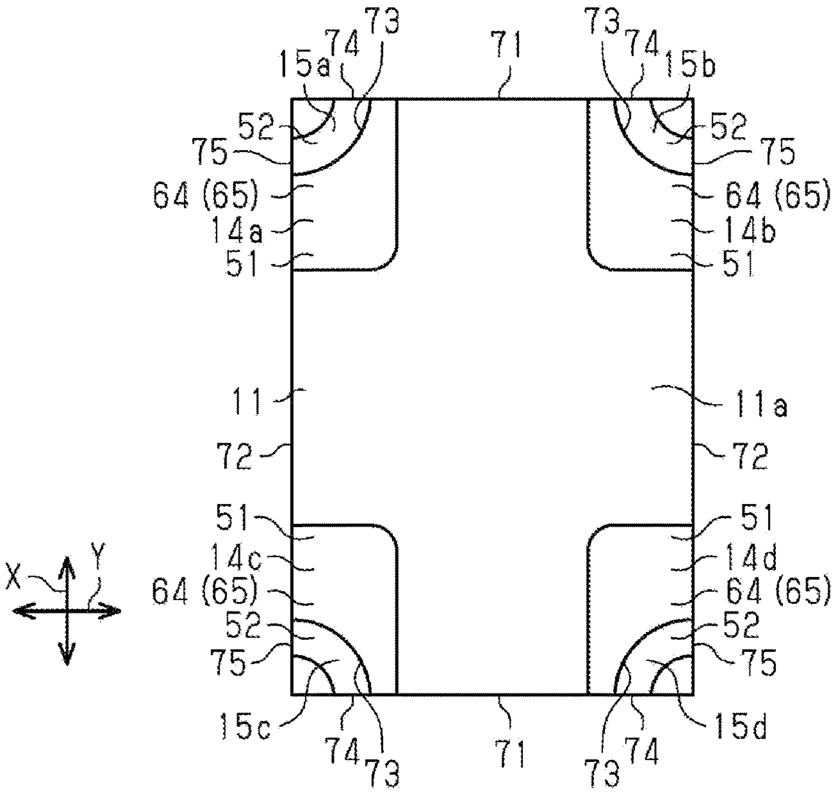
FIG. 7 is a plan view for illustrating fourth metal layers and fifth metal layers of the outer electrodes of the coil component according to the embodiment.

The fourth metal layer 64 shown in FIG. 7 is provided on the third metal layer 63. The fourth metal layer 64 is a metal film containing nickel (Ni) as a main ingredient. The fourth metal layer 64 is formed by, for example, electrolytic plating. The fourth metal layer 64 has, for example, a thickness of about 3 μm. The fourth metal layer 64 has a length of about 72 μm in the short-side direction, and has a tolerance of about 10 μm. An elongation of the fourth metal layer 64 along the short-side ridge portion 71 of the bottom surface 11*a* is less than or equal to about 11 μm. More preferably, the elongation is less than or equal to about 5 μm. The fourth metal layer 64 corresponds to a coating layer provided on the third metal layer 63 that makes up the low resistance layer. Here, the coating layer protects the third metal layer 63 that makes up the low resistance layer by covering the third metal layer 63. In other words, with the fourth metal layer 64 made of nickel, it is possible to suppress occurrence of so-called copper erosion in the third metal layer 63.

The fifth metal layer 65 shown in FIG. 7 is provided on the fourth metal layer 64. The fifth metal layer 65 is a metal film containing tin (Sn) as a main ingredient. The fifth metal layer 65 is formed by, for example, electrolytic plating. The fifth metal layer 65 has, for example, a thickness of about 3 μm. The fifth metal layer 65 has a length of about 75 μm in the short-side direction, and has a tolerance of about 10 μm. An elongation of the fifth metal layer 65 along the short-side ridge portion 71 of the bottom surface 11*a* is preferably less than or equal to about 13 μm.

In the thus configured coil component 10, when the first substrate 11, the multilayer body 13, and the second substrate 12 are laminated as a laminate, the laminate has a length of about 0.23 mm in the lamination direction D (Z-axial direction), a length of about 0.3 mm in the Y-axis direction that is the short-side direction among directions perpendicular to the lamination direction D, and a length of about 0.45 mm in the X-axis direction that is the long-side direction among the directions perpendicular to the lamination direction D. A tolerance of the length in each of the three axial directions is about ±0.02 mm.

Figure 8:
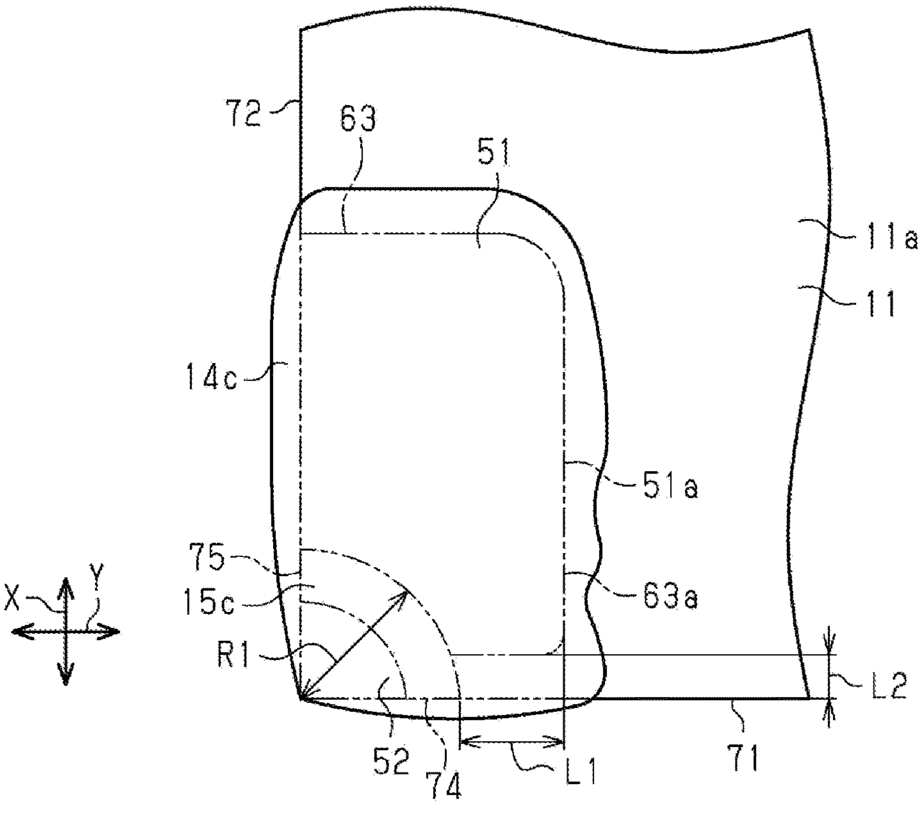
FIG. 8 is a view for illustrating the multilayer structure of each outer electrode of the coil component according to the embodiment.

As shown in FIG. 8, where, in the electrode body portion 51 adjacent to the recess 15*c* in a direction along the short side of the bottom surface 11*a*, an end portion at a position spaced apart from the recess 15*c* in the direction along the short side is defined as a distant end portion 51*a*, a distance L1 in the direction along the short side between the recess 15*c* and the distant end portion 51*a* is preferably less than or equal to about 25 μm. More specifically, a distance L1 from the recess 15*c* to a distant end portion 63*a* of the third metal layer 63 in the electrode body portion 51 is preferably less than or equal to about 25 μm. Although the recess 15*c* and the electrode body portion 51 around the recess 15*c* are specifically described, the other recesses 15*a*, 15*b*, 15*d* and the electrode body portions 51 around the other recesses 15*a*, 15*b*, 15*d* are also preferably set to the distance L1 as described above.

A distance L2 from the short-side ridge portion 71 to the electrode body portion 51 in the long-side direction of the bottom surface 11*a*, shown in FIG. 8, is preferably greater than or equal to about 3.3 μm and less than or equal to about 16.7 μm (i.e., from about 3.3 μm to about 16.7 μm). Although the electrode body portion 51 and the short-side ridge portion 71 around the recess 15*c* are specifically described in FIG. 8, the electrode body portions 51 and the short-side ridge portions 71 around the other recesses 15*a*, 15*b*, 15*d* are also preferably set to the distance L2 as described above. At this time, the distances L2 respectively associated with the recesses 15*a*, 15*b*, 15*c*, 15*d* may be equal to one another or may be different from one another.

As shown in FIG. 8, the recess 15*c* has a radius R1 of about 62 μm after the fourth metal layer 64 is formed, and has a tolerance of about ±15 μm. The recess 15*c* has a radius R1 of about 55 μm after the fifth metal layer 65 is formed, and has a tolerance of about ±15 μm. FIG. 8 is schematically shown, and the origin position of the radius R1 can be different from an actual one. Not limited to the radius R1 of the recess 15*c*, the other recesses 15*a*, 15*b*, 15*d* are also preferably set to the radius R1.

The operation of the thus configured coil component 10 will be described below. The outer electrodes 14*a*, 14*c* are used as input terminals. The outer electrodes 14*b*, 14*d* are used as output terminals.

Differential transmission signals composed of a first signal and a second signal that are different in phase by 180 degrees are respectively input to the outer electrodes 14*a*, 14*c*. Because the first signal and the second signal are in a differential mode, the first signal and the second signal generate mutually opposite magnetic fluxes in the coils 22*a*, 22*b* when passing through the coils 22*a*, 22*b*. The magnetic flux generated in the coil 22*a* and the magnetic flux generated in the coil 22*b* cancel out each other. Therefore, in each of the coils 22*a*, 22*b*, almost no variation in magnetic flux occurs due to flow of the first signal or the second signal. In other words, the coil 22*a* or the coil 22*b* does not generate counter-electromotive force that impedes flow of the first signal or the second signal. Thus, the coil component 10 has an extremely small impedance for the first signal and the second signal.

On the other hand, when the first signal and the second signal each contain common mode noise, the common mode noises respectively generate magnetic fluxes having the same direction in the coils 22*a*, 22*b* when passing through the coils 22*a*, 22*b*. Therefore, in each of the coils 22*a*, 22*b*, magnetic flux increases due to flow of the common mode noise. Thus, each of the coils 22*a*, 22*b* generates counter-electromotive force that impedes flow of the common mode noise. Thus, the coil component 10 has a large impedance for the first signal and the second signal.

Next, a manufacturing method for the coil component 10 will be described with reference to FIG. 9 to FIG. 18.

Figure 9:
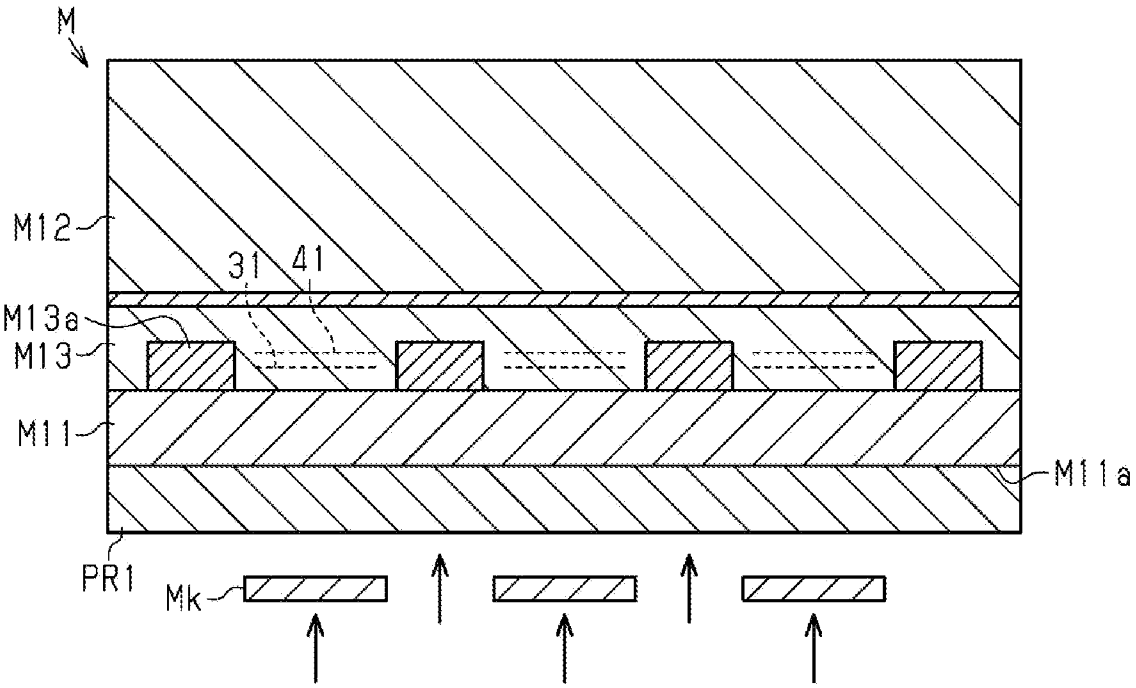
FIG. 9 is a view for illustrating a manufacturing method for the coil component according to the embodiment.

As shown in FIG. 9, positions corresponding to the recesses 15*a*, 15*b*, 15*c*, 15*d* of a photoresist PR1 on a bottom surface M11*a* of a mother substrate M11 are exposed to light while being aligned with the coil conductors 31, 41 in a mother multilayer body M13. At this time, by placing a mask Mk at portions other than the recesses 15*a* to 15*d*, the positions corresponding to the recesses 15*a*, 15*b*, 15*c*, 15*d* of the photoresist PR1 are exposed to light as described above. The mother multilayer body M13 will be the multilayer body 13, and is disposed between the mother substrate M11 that will be the first substrate 11 and a mother substrate M12 that will be the second substrate 12. Hereinafter, a body made up of the mother substrate M11, the mother substrate M12, and the mother multilayer body M13 will be described as a mother body M. The mother multilayer body M13 includes conductor portions M13*a* that will be not only the coil conductors 31, 41 but also the extended portions 32 to 37, 42 to 46.

Figure 10:
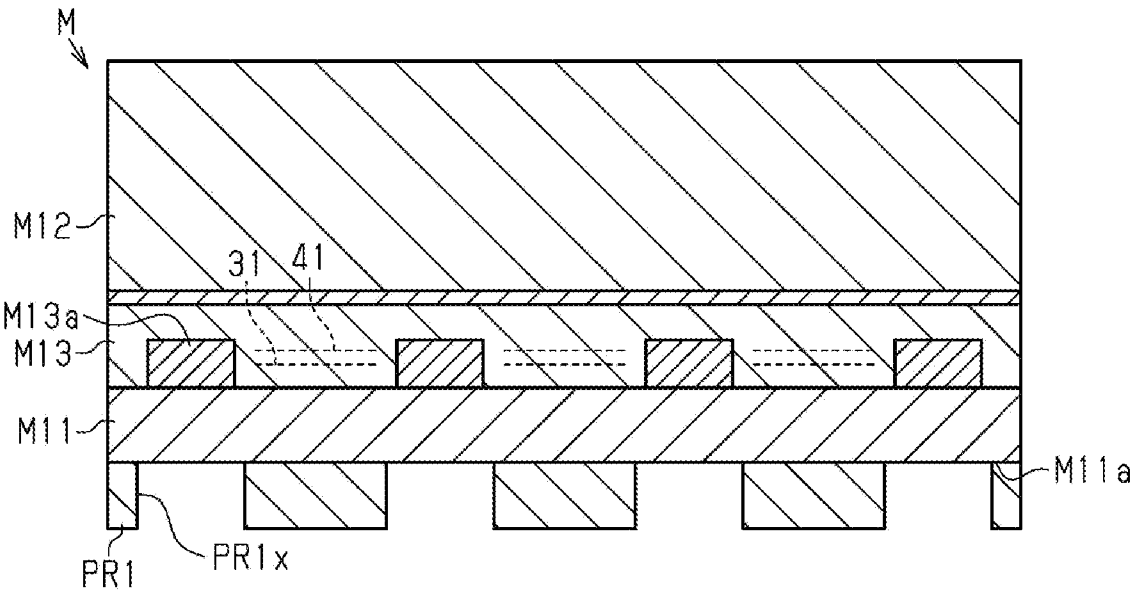
FIG. 10 is a view for illustrating the manufacturing method for the coil component according to the embodiment.

Subsequently, as shown in FIG. 10, the photoresist PR1 is developed. Thus, the photoresist PR1 has openings PR1*x* corresponding to the recesses 15*a*, 15*b*, 15*c*, 15*d* and exposed to light.

Figure 11:
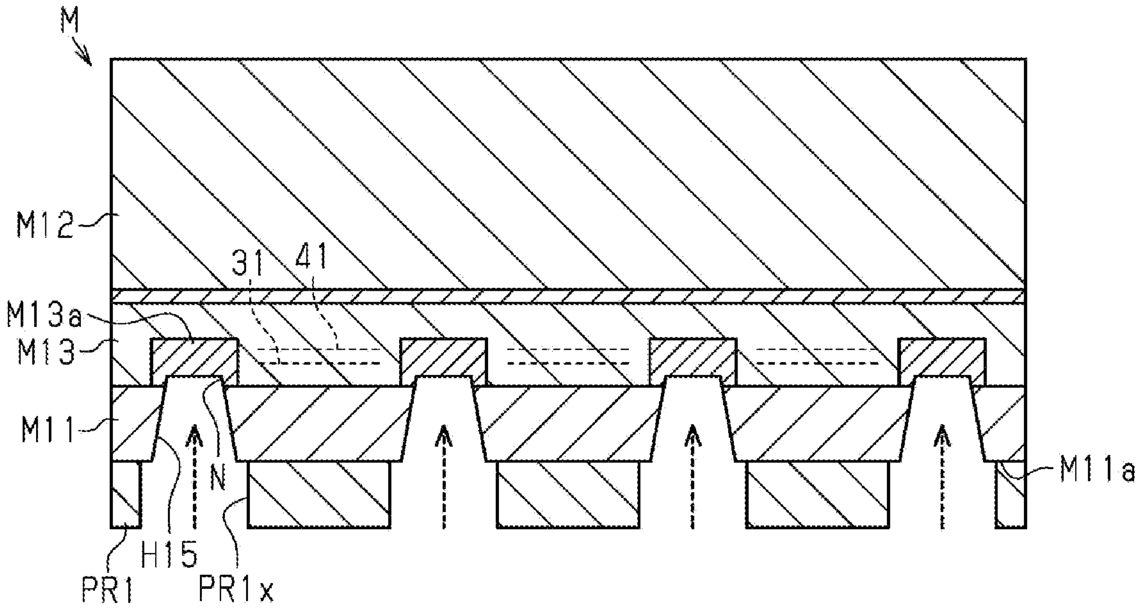
FIG. 11 is a view for illustrating the manufacturing method for the coil component according to the embodiment.

After that, as shown in FIG. 11, through-holes H15 are formed at positions to form the recesses 15*a*, 15*b*, 15*c*, 15*d* in the mother substrate M11 by, for example, sand blast via the openings PR1*x* of the photoresist PR1. At this time, cutout portions N may be formed in the conductor portions M13*a* at positions corresponding to the through-holes H15 in the mother multilayer body M13. The through-holes H15 may be formed by laser beam machining other than sand blast or may be formed by a combination of sand blast and laser beam machining.

Figure 12:
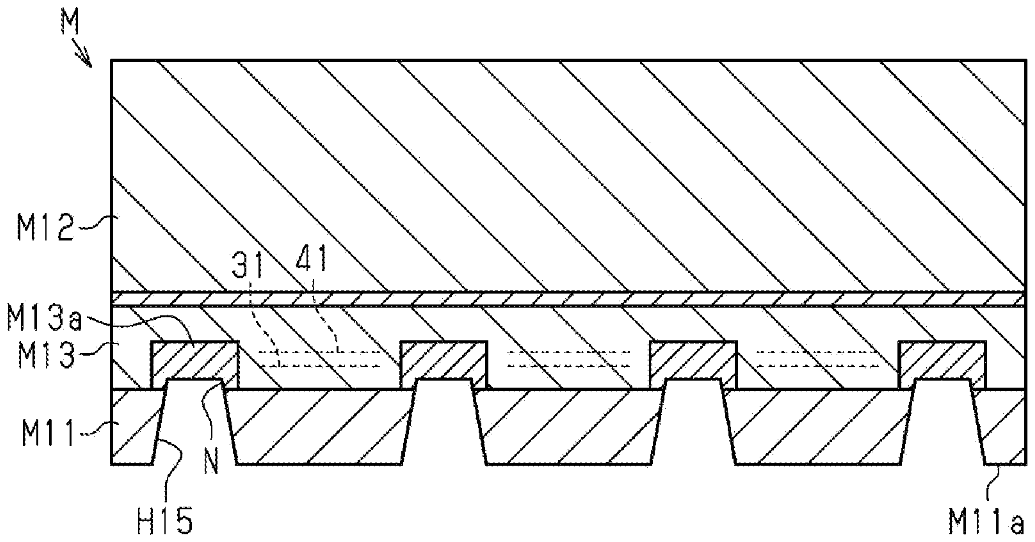
FIG. 12 is a view for illustrating the manufacturing method for the coil component according to the embodiment.

Then, as shown in FIG. 12, the photoresist PR1 is removed by using, for example, organic solvent.

Figure 13:
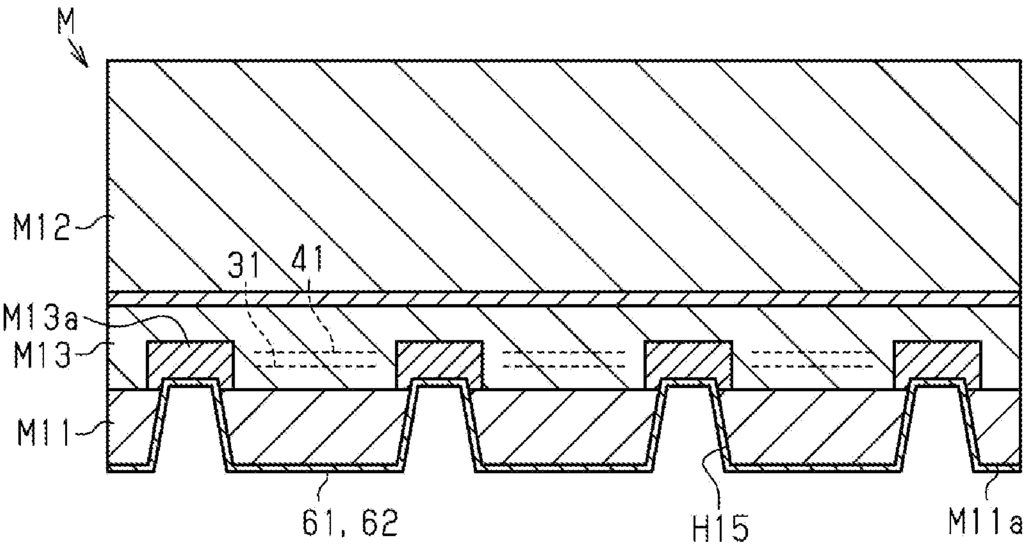
FIG. 13 is a view for illustrating the manufacturing method for the coil component according to the embodiment.

Subsequently, as shown in FIG. 13, the first metal layer 61 and the second metal layer 62 are deposited by sputtering on all the bottom surface M11*a* of the mother body M (mother substrate M11).

Figure 14:
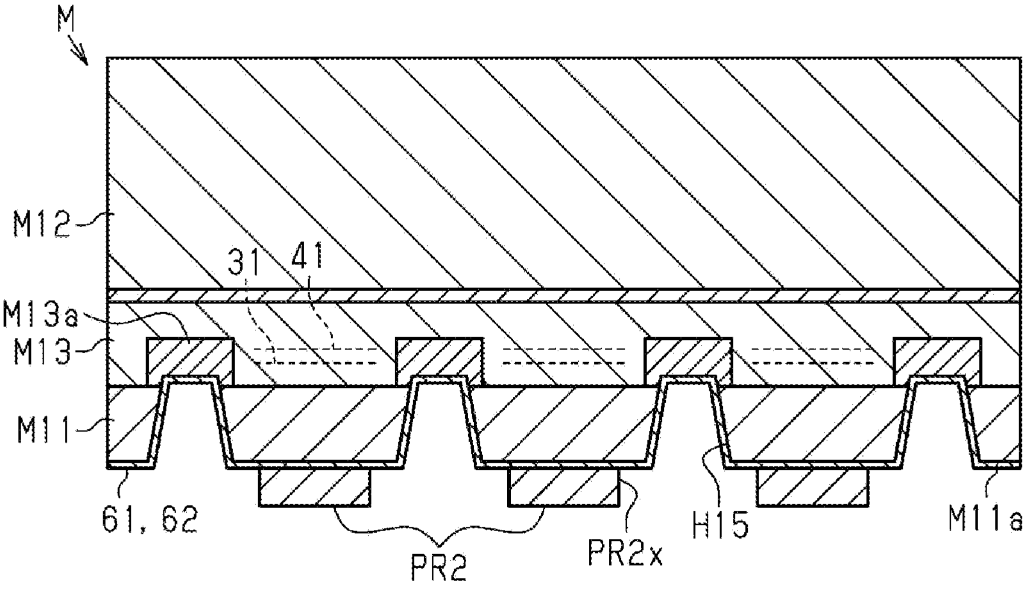
FIG. 14 is a view for illustrating the manufacturing method for the coil component according to the embodiment.

After that, as shown in FIG. 14, a photoresist PR2 is formed on a flat portion around the through-holes H15 of the bottom surface M11*a*. In other words, the photoresist PR2 has openings PR2*x* at positions corresponding to the through-holes H15.

Figure 15:
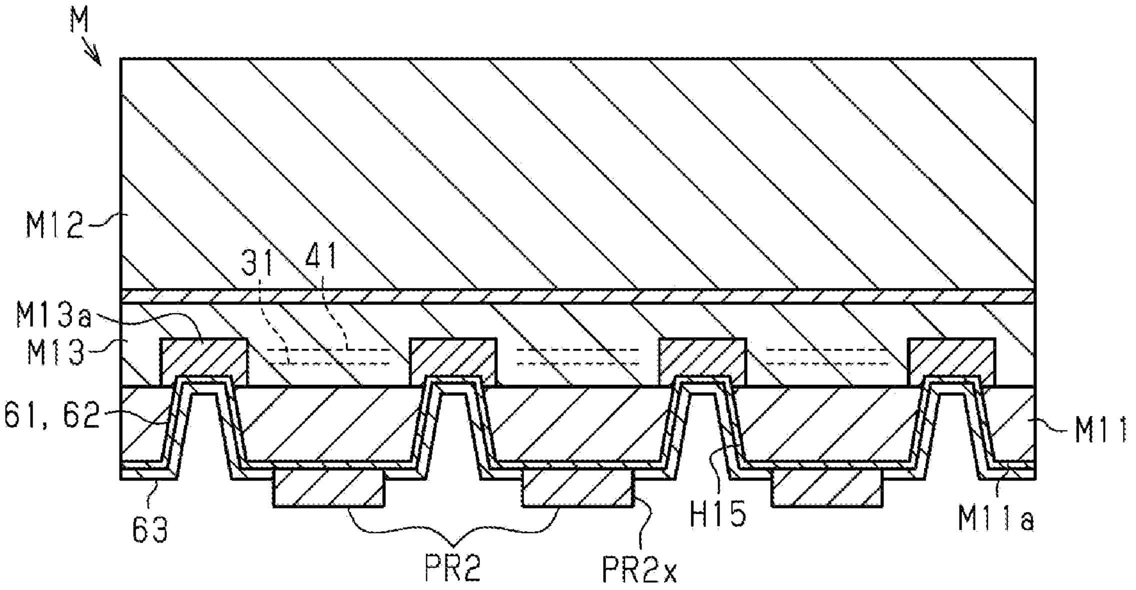
FIG. 15 is a view for illustrating the manufacturing method for the coil component according to the embodiment.

Then, as shown in FIG. 15, the third metal layers 63 are formed by electrolytic plating by using the first metal layer 61 and the second metal layer 62 as feeding films.

Figure 16:
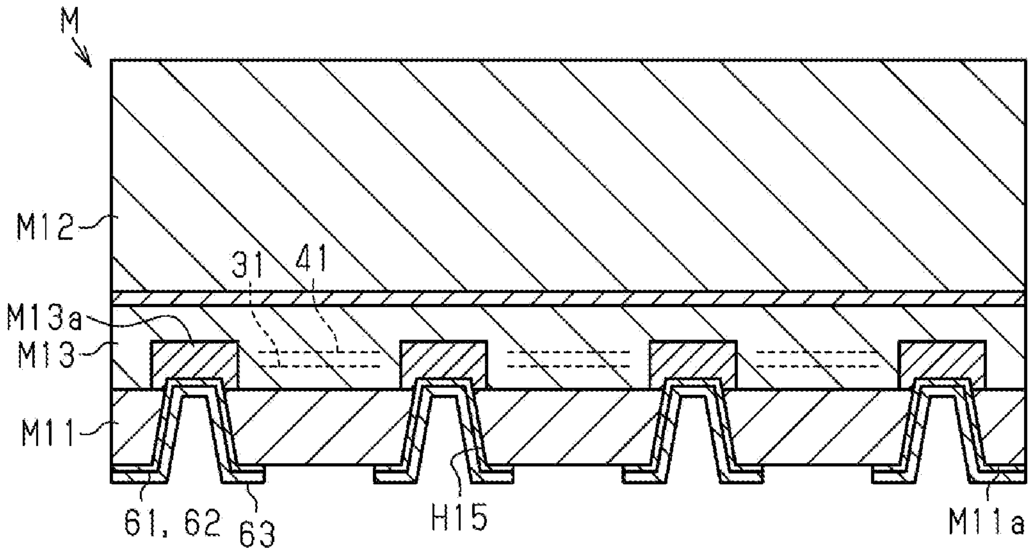
FIG. 16 is a view for illustrating the manufacturing method for the coil component according to the embodiment.

Subsequently, as shown in FIG. 16, the photoresist PR2 is removed by using organic solvent as in the case of the photoresist PR1. Then, the first metal layer 61 and the second metal layer 62, exposed from the third metal layers 63, are removed by, for example, wet etching or the like.

Figure 17:
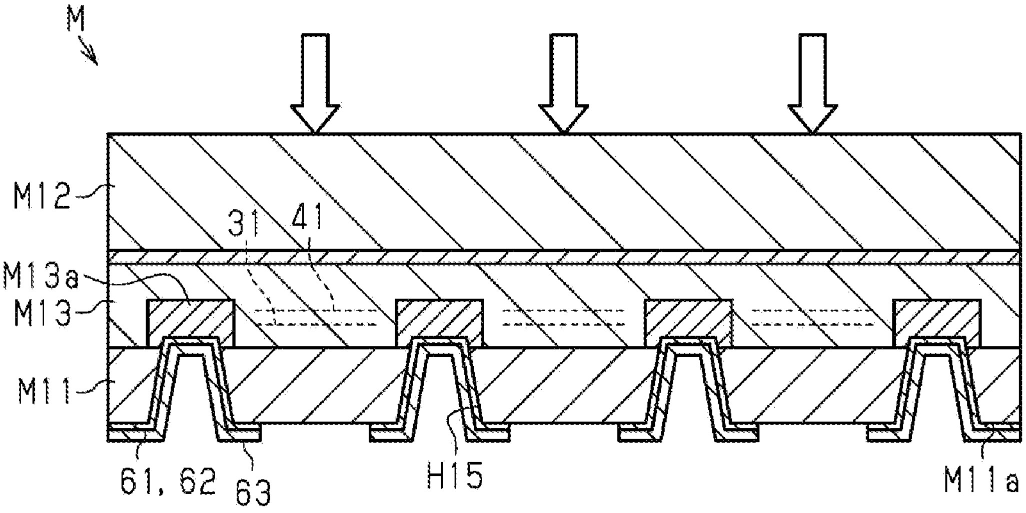
FIG. 17 is a view for illustrating the manufacturing method for the coil component according to the embodiment.

After that, as shown in FIG. 17, the mother substrate M12 is formed into a thin sheet shape by, for example, grinding or polishing.

Figure 18:
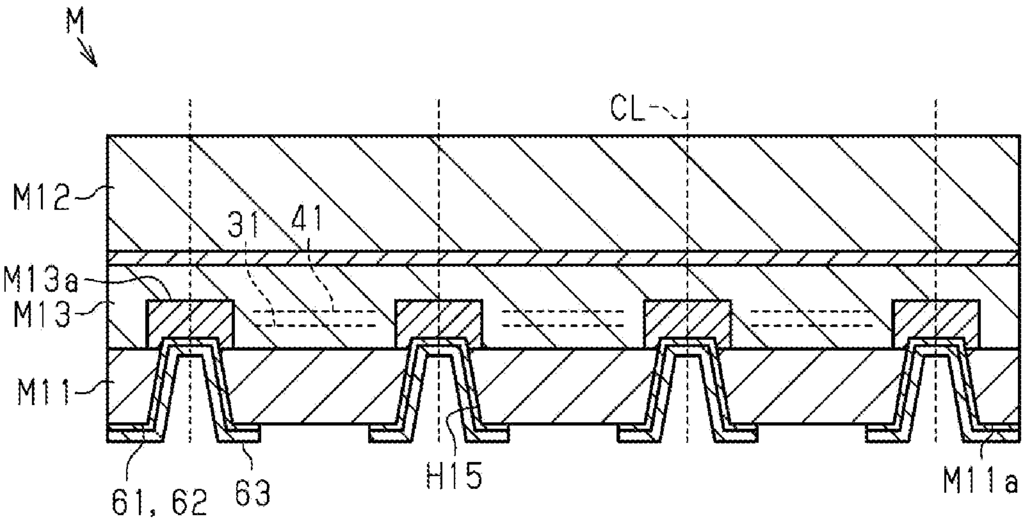
FIG. 18 is a view for illustrating the manufacturing method for the coil component according to the embodiment.

Then, as shown in FIG. 18, the mother body M is cut along cut lines CL into a size of each coil component 10. Thus, the conductor portions M13*a* of the mother multilayer body M13 become the extended portions 32 to 37, 42 to 46. After cutting, chamfering is performed by barrel polishing or the like. At this time, since each third metal layer 63 of this example is formed at a position spaced apart from the short-side ridge portion 71, an elongation of the third metal layer 63 along the short-side ridge portion 71 is suppressed.

Subsequently, the outer electrodes 14*a*, 14*b*, 14*c*, 14*d* are formed by forming the fourth metal layers 64 and the fifth metal layers 65 in this order by using electrolytic plating. As a result, the coil component 10 is finished. When the fourth metal layer 64 and the fifth metal layer 65 are formed, an elongation of each third metal layer 63 along the short-side ridge portion 71 is suppressed as described above, so an elongation of the fourth metal layer 64 and an elongation of the fifth metal layer 65 along the short-side ridge portion 71 are also similarly suppressed.

According to the above-described present embodiment, the following advantageous effects are obtained.

(1) Since the first metal layer 61 serving as a base layer is formed at a position spaced apart from the short-side ridge portion 71 between the bottom surface 11*a* and the side surface 11*c* or the short-side ridge portion 71 between the bottom surface 11*a* and the side surface 11*d* on the bottom surface 11*a*, an elongation of the first metal layer 61 along the short-side ridge portion 71 by barrel polishing or the like is suppressed. Since an elongation of the first metal layer 61 along the short-side ridge portion 71 is suppressed, stress concentration on the portion is reduced. Therefore, it is possible to suppress occurrence of a fracture of the first substrate 11 and cracks of the outer electrodes 14*a*, 14*b*, 14*c*, 14*d* around the portions.

(2) Since the second metal layer 62 and the third metal layer 63 are formed at positions spaced apart from the short-side ridge portion 71 on the bottom surface 11*a*, an elongation of the second metal layer 62 and an elongation of the third metal layer 63 along the short-side ridge portion 71 due to barrel polishing or the like are suppressed. Since an elongation of the second metal layer 62 and an elongation of the third metal layer 63 along the short-side ridge portion 71 are suppressed, stress concentration on the portions is reduced. Therefore, it is possible to suppress occurrence of a fracture of the first substrate 11 and cracks of the outer electrodes 14*a*, 14*b*, 14*c*, 14*d* around the portions.

(3) For the outer electrodes 14*a*, 14*b*, 14*c*, 14*d*, even in the configuration that further includes the connection portions 52 provided in the recesses 15*a*, 15*b*, 15*c*, 15*d* and electrically connecting the coils 22*a*, 22*b* to the electrode body portions 51, since an elongation of the third metal layer 63 along the short-side ridge portion 71 is suppressed, stress concentration on the portion is reduced. Therefore, it is possible to suppress occurrence of a fracture of the first substrate 11 and cracks of the outer electrodes 14*a*, 14*b*, 14*c*, 14*d* around the portions.

(4) The third metal layer 63 of the connection portion 52 is formed at least at a position that overlaps the recess ridge portion 74 of an associated one of the recesses 15*a* to 15*d* continuous from the short-side ridge portion 71 toward the top surface 11*b*. In other words, in each of the recesses 15*a* to 15*d*, the third metal layer 63 and the connection portion 52 including the third metal layer 63 can be formed in a wide range. Therefore, when the coil component 10 is connected to a mounting substrate by solder, it is possible to contribute to improvement in connection reliability between solder and the connection portions 52 of the recesses 15*a* to 15*d*.

(5) Since the connection portion 52 has the same multi-layer structure as the electrode body portion 51, the connection portion 52 can be formed in the same manufacturing process as the electrode body portion 51.

(6) The plurality of metal layers 61 to 65 include the fourth metal layer 64 as the coating layer on the third metal layer 63 that makes up the low resistance layer. Because an elongation of the third metal layer 63 along the short-side ridge portion 71 is suppressed, an elongation of the fourth metal layer 64 along the short-side ridge portion 71 is also similarly suppressed.

(7) The third metal layer 63 that makes up the low resistance layer is a metal layer containing copper, and the fourth metal layer 64 that is the coating layer has a metal layer containing nickel. By suppressing an elongation of the fourth metal layer 64 containing nickel along the short-side ridge portion 71, erosion of the first substrate 11 by the fourth metal layer 64 is suppressed, so it is possible to contribute to improvement in close contact between each of the outer electrodes 14*a*, 14*b*, 14*c*, 14*d* and the first substrate 11.

(8) When the first substrate 11, the multilayer body 13, and the second substrate 12 are laminated as a laminate, the laminate has a length of less than or equal to about 0.23 mm in the lamination direction D, a length of less than or equal to about 0.3 mm in a direction along the short side among directions perpendicular to the lamination direction D, and a length of less than or equal to about 0.45 mm in a direction along the long side among the directions perpendicular to the lamination direction D. In this way, it is possible to suppress an elongation along the short-side ridge portion 71 as described above in the small-sized coil component.

(9) Since the distance L1 from each of the recesses 15*a* to 15*d* to the distant end portion 51*a* of the electrode body portion 51 adjacent to the same one of the recesses 15*a* to 15*d* in the direction along the short side is less than or equal to about 25 μm, it is possible to suppress proximity between the electrode body portions 51, so it is possible to suppress occurrence of leak current. Thus, an L value improves, so noise cancellation capability improves.

(10) When the distance L2 from the short-side ridge portion 71 to the electrode body portion 51 is greater than or equal to about 3.3 μm and less than or equal to about 16.7 μm (i.e., from about 3.3 μm to about 16.7 μm), an elongation of the electrode body portion 51 along the short-side ridge portion 71 is suitably suppressed.

(Other Embodiments)

The above-described embodiment may be modified as follows. The above-described embodiment and the following modifications may be implemented in combination without any technical contradiction.

In the above-described embodiment, each of the outer electrodes 14*a*, 14*b*, 14*c*, 14*d* is made up of five metal layers 61, 62, 63, 64, 65; however, the configuration is not limited thereto. Alternatively, each of the outer electrodes 14*a*, 14*b*, 14*c*, 14*d* may be made up of four or less or six or more layers.

In the above-described embodiment, the recesses 15*a*, 15*b*, 15*c*, 15*d* are respectively provided at four corner portions; however, the configuration is not limited thereto. For example, a recess may be added to the center of the bottom surface 11*a* of the first substrate 11. Alternatively, another recess may be added between the recess 15*a* and the recess 15*c* or between the recess 15*b* and the recess 15*d*.

In the above-described embodiment, the third metal layer 63 is formed at a position spaced apart from the short-side ridge portion 71. In addition to this, the third metal layer 63 may be formed at a position spaced apart from the long-side ridge portion 72.

In the above-described embodiment, the coil component 10 includes four outer electrodes 14*a*, 14*b*, 14*c*, 14*d*; however, the configuration is not limited thereto. The coil component 10 may include six outer electrodes. In this case, an outer electrode is provided between the outer electrode 14*a* and the outer electrode 14*c* arranged in the long-side direction (X-axis direction) of the coil component 10, and an outer electrode is provided between the outer electrode 14*b* and the outer electrode 14*d* arranged in the long-side direction (X-axis direction) of the coil component 10.

In the above-described embodiment, the coil component 10 including a flat spiral coil conductor is employed; however, the configuration is not limited thereto. For example, a coil component may include a three-dimensional spiral (helical) coil conductor in which a spiral advances in the lamination direction D.

In the above-described embodiment, the first metal layer 61 serving as the base layer and the second and third metal layers 62, 63 serving as the low resistance layers are provided at positions spaced apart from the short-side ridge portion 71; however, the configuration is not limited thereto. For example, only the base layer may be provided at a position spaced apart from the short-side ridge portion 71.

In the above-described embodiment, the low resistance layer is made up of two layers, that is, the second metal layer 62 and the third metal layer 63; however, the configuration is not limited thereto. The low resistance layer may be made up of one or three or more layers.

In the above-described embodiment, the connection portion 52 has the same multilayer structure as the electrode body portion 51; however, the configuration is not limited thereto. The connection portion and the electrode body portion may have different multilayer structures. For example, the number of laminated layers may be varied between the connection portion and the electrode body portion.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a magnetic substrate having a rectangular bottom surface having a pair of long sides and a pair of short sides, a top surface located across from the bottom surface, and a pair of long-side side surfaces and a pair of short-side side surfaces each connecting the bottom surface and the top surface, and the magnetic substrate having a recess at a corner portion of the bottom surface;

a multilayer body having an electrically insulating layer on the top surface and a coil in the electrically insulating layer; and an outer electrode provided on the bottom surface, the outer electrode having an electrode body portion provided around the recess on the bottom surface, the electrode body portion being made up of a plurality of laminated metal layers and having a base layer located at an innermost side of the plurality of metal layers in a lamination direction of the multilayer body, and the base layer being on the bottom surface at a position spaced apart from a short-side ridge portion between the bottom surface and one of the short-side side surfaces, wherein in the electrode body portion adjacent to the recess in a direction along the short side, an end portion at a position spaced apart from the recess in the direction along the short side is defined as a distant end portion, a distance in the direction along the short side between the recess and the distant end portion is less than or equal to 25 μm.

2. The coil component according to claim 1, wherein the plurality of metal layers includes a low resistance layer on the base layer, the low resistance layer being lower in electrical resistance than the base layer, and the low resistance layer is at a position spaced apart from the short-side ridge portion on the bottom surface.

3. The coil component according to claim 1, wherein the outer electrode further includes a connection portion at the recess and electrically connecting the coil and the electrode body portion.

4. The coil component according to claim 3, wherein the connection portion is integrated with the electrode body portion and configured from the electrode body portion onto a recess ridge portion between the recess and the one of the short-side side surfaces.

5. The coil component according to claim 3, wherein the connection portion has the same multilayer structure as the electrode body portion.

6. The coil component according to claim 2, wherein the plurality of metal layers includes a coating layer on the low resistance layer.

7. The coil component according to claim 6, wherein the low resistance layer is a metal layer containing copper, and the coating layer has a metal layer containing nickel.

8. The coil component according to claim 1, further comprising:

a magnetic layer on the multilayer body, wherein when the magnetic substrate, the multilayer body, and the magnetic layer are laminated as a laminate, the laminate has a length of 0.23 mm or less in a lamination direction, a length of 0.3 mm or less in a direction along the short side in directions perpendicular to the lamination direction, and a length of 0.45 mm or less in a direction along the long side in the directions perpendicular to the lamination direction.

9. The coil component according to claim 2, wherein the outer electrode further includes a connection portion at the recess and electrically connecting the coil and the electrode body portion.

10. The coil component according to claim 4, wherein the connection portion has the same multilayer structure as the electrode body portion.

11. The coil component according to claim 3, wherein the plurality of metal layers includes a low resistance layer and a coating layer on the low resistance layer.

12. The coil component according to claim 4, wherein the plurality of metal layers includes a low resistance layer and a coating layer on the low resistance layer.

13. The coil component according to claim 5, wherein the plurality of metal layers includes a low resistance layer and a coating layer on the low resistance layer.

14. The coil component according to claim 2, further comprising:

a magnetic layer on the multilayer body, wherein when the magnetic substrate, the multilayer body, and the magnetic layer are laminated as a laminate, the laminate has a length of 0.23 mm or less in a lamination direction, a length of 0.3 mm or less in a direction along the short side in directions perpendicular to the lamination direction, and a length of 0.45 mm or less in a direction along the long side in the directions perpendicular to the lamination direction.

15. The coil component according to claim 3, further comprising:

a magnetic layer on the multilayer body, wherein when the magnetic substrate, the multilayer body, and the magnetic layer are laminated as a laminate, the laminate has a length of 0.23 mm or less in a lamination direction, a length of 0.3 mm or less in a direction along the short side in directions perpendicular to the lamination direction, and a length of 0.45 mm or less in a direction along the long side in the directions perpendicular to the lamination direction.

16. The coil component according to claim 4, further comprising:

a magnetic layer on the multilayer body, wherein when the magnetic substrate, the multilayer body, and the magnetic layer are laminated as a laminate, the laminate has a length of 0.23 mm or less in a lamination direction, a length of 0.3 mm or less in a direction along the short side in directions perpendicular to the lamination direction, and a length of 0.45 mm or less in a direction along the long side in the directions perpendicular to the lamination direction.

* * * * *